United States Patent [19]

Mesenbrink

[11] 4,085,725
[45] Apr. 25, 1978

[54] FORCED AIR ROOM HEATER FOR FRANKLIN STOVE

[76] Inventor: Michael V. Mesenbrink, 10902 SW. 63rd, Portland, Oreg. 97219

[21] Appl. No.: 730,339

[22] Filed: Oct. 7, 1976

[51] Int. Cl.² .............................................. F24H 3/08
[52] U.S. Cl. ................... 126/110 B; 126/67; 165/76; 165/137; 165/138; 165/DIG. 2; 285/205; 403/187
[58] Field of Search ................. 126/110 B, 61, 63, 66, 126/67, 70–72, 121, 135; 165/76, 137, 138, DIG. 2; 285/205, 206, 158, 161; 403/187, 262

[56] References Cited

U.S. PATENT DOCUMENTS

| | | | |
|---|---|---|---|
| 2,321,132 | 6/1943 | Czaja | 126/110 B |
| 2,652,823 | 9/1953 | Longworth et al. | 126/106 X |
| 2,762,448 | 9/1956 | Schmid et al. | 285/158 X |
| 2,938,712 | 5/1960 | Pellmyr | 165/137 |
| 3,734,171 | 5/1973 | Ares et al. | 165/76 X |
| 4,007,726 | 2/1977 | Kenchel | 126/67 |

FOREIGN PATENT DOCUMENTS 549,413  11/1942  United Kingdom .................. 126/71

*Primary Examiner*—William E. Wayner
*Assistant Examiner*—William E. Tapolcai, Jr.
*Attorney, Agent, or Firm*—Chernoff & Vilhauer

[57] ABSTRACT

A forced air room heater for installation in a Franklin stove includes a mounting plate configured for covering the flue opening located in the back wall of the stove and having a central opening passing therethrough. A plenum chamber arranged for placement above the baffle which divides the firebox of the stove has an inlet interconnecting it to the opening in the mounting plate and an outlet opening outside of the stove. An electric motor powered fan is attached to the mounting plate opposite the inlet for forcing air first into the plenum where it is heated, then out of the outlet. In one embodiment the outlet opens out of the stove through its front door opening. In a second embodiment the outlet exits the stove through the mounting plate allowing operation of the stove with its door closed.

5 Claims, 10 Drawing Figures

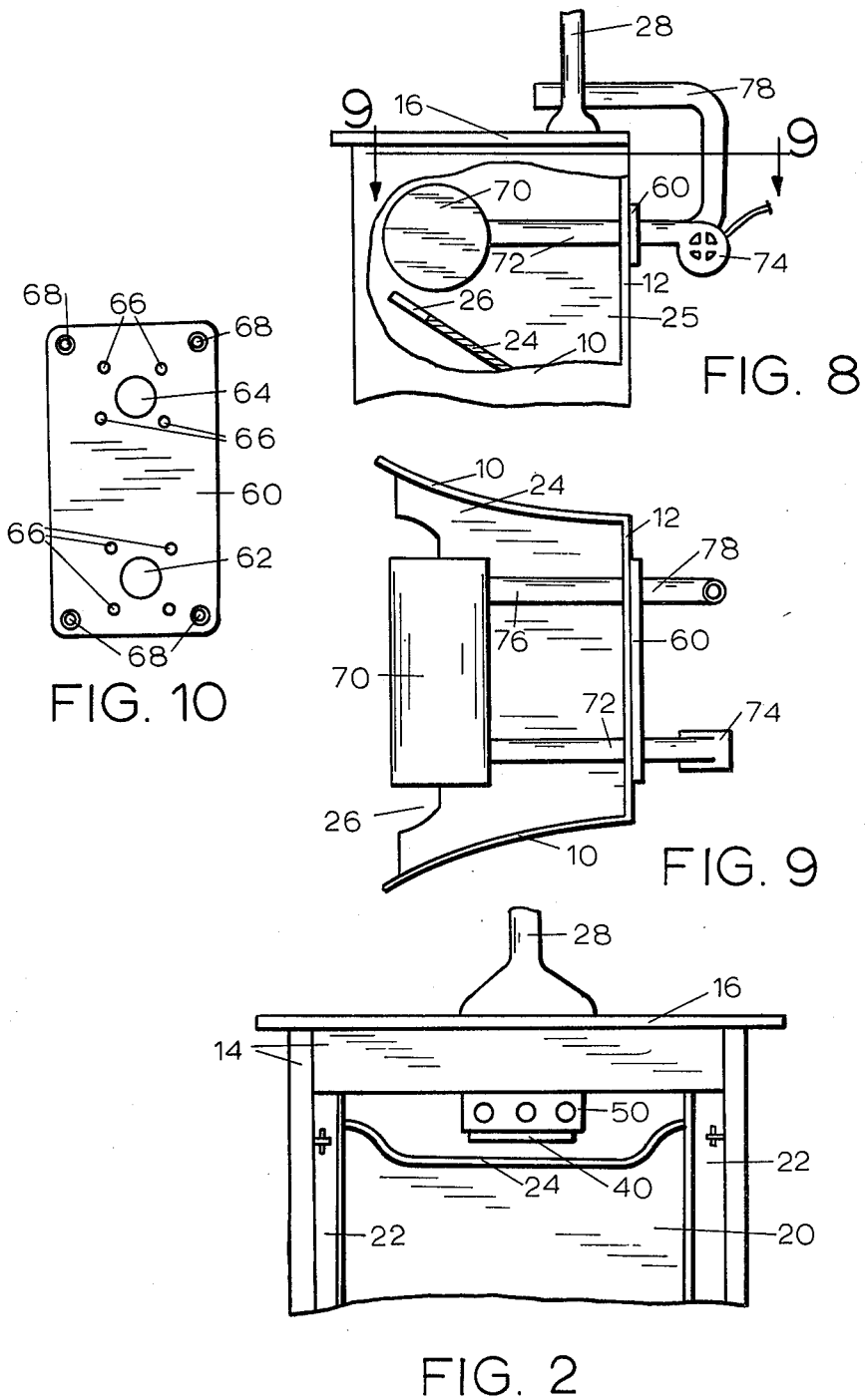

FORCED AIR ROOM HEATER FOR FRANKLIN STOVE

BACKGROUND OF THE INVENTION

As energy shortages become more severe, increased efficiency utilization of heating systems using available lower priced fuel is desirable. In response, add-on convective and forced air heaters have become available for installation in wood burning stoves. These prior art heaters generally are placed in the fireboxes of the stoves in close proximity with the fire, often also serving as a grate. In this placement they are exposed to the high temperature of the flame and the corrosive environment of the ash. As a result they are subject to burn out and are short lived. In addition many stoves, such as the Franklin stove, have small fire boxes so that these prior art add-on forced air heaters leave little room for the fire and are aesthetically objectionable.

Forced air heaters of the type shown in the present invention are well known in the prior art as integral parts of stoves or furnaces. However, they are not adaptable for installation in existing stoves not so equipped. In fact these integral units could not readily be adapted for this use.

SUMMARY OF THE INVENTION

In its basic concept the heater of this invention comprises a mounting plate configured for convering the flue opening in the back wall of a Franklin stove and having a medial opening therethrough for passing cold air from a fan, located outside of the stove and connected to the mounting plate, to a plenum chamber, located inside the firebox of the stove and also connected to the mounting plate, thence to the room through outlet means which are connected to the plenum chamber.

It is by virtue of this foregoing basic concept that the principal objective of this invention is achieved; namely, to overcome the aforementioned disadvantages and limitations of add-on forced air heaters of the prior art.

Another object of this invention is to provide a heater of the class described which can be arranged to exit either through the front door of the stove or through its back wall.

Yet another object of this invention is to provide a heater of the class described which fits entirely within the upper section of the stove firebox.

A further object of this invention is to provide a heater of the class described which can be installed by inexperienced personnel using only simple tools.

A still further object of this invention is to provide a heater of the class described which is inexpensive and simple to operate.

A still further object of this invention is to provide a heater of the class described which is of simplified construction for economical manufacture and is of rugged design for long life.

The foregoing and other objects and advantages of this invention will appear from the following detailed description taken in conjunction with the accompanying drawings of a preferred embodiment.

BRIEF DESCRIPTION OF THE DRAWINGS

FIG. 2 is a fragmentary view, in front elevation, taken on the line 2—2 of FIG. 1.

FIG. 8 is a fragmentary view in side elevation, partially broken away, of a second embodiment of the invention.

FIG. 9 is a fragmentary, horizontal, sectional view taken on the line 9—9 of FIG. 8.

FIG. 10 is a detailed view, similar to that of FIG. 7, of the mounting plate of FIG. 8.

DETAILED DESCRIPTION OF A PREFERRED EMBODIMENT

Figure 1:
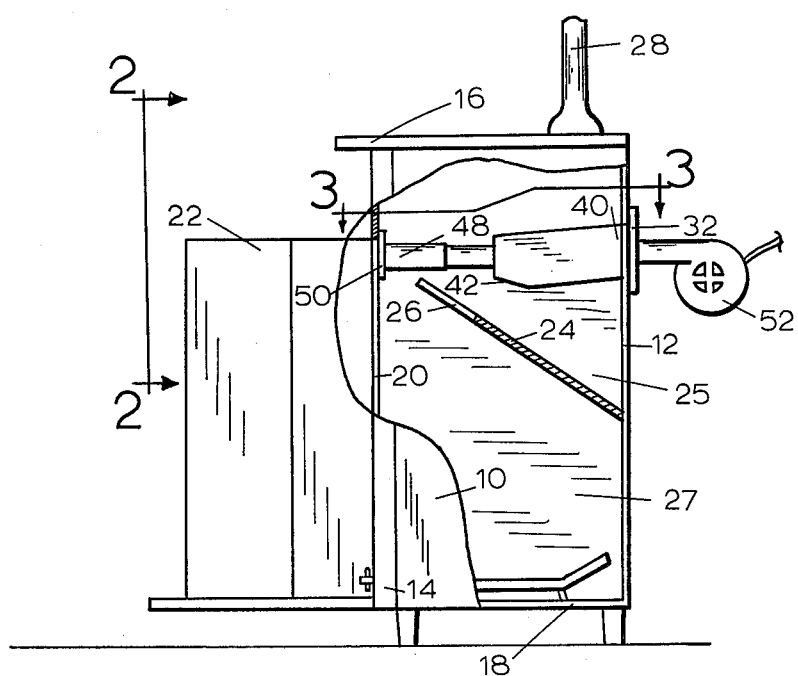
FIG. 1 is a view in side elevation, partially broken away, of a stove embodying a first embodiment of the heater of the present invention.

The forced air room heater of the present invention is configured for installation in an enclosed stove. The stove, best illustrated in FIGS. 1 and 2, preferably is of the class known as Franklin stoves and includes a firebox which is enclosed by opposed side walls 10, a back wall 12, a front wall 14, a top 16 and a bottom 18. The side walls curve inwardly towards the rear so that the back wall is narrower than the front wall. The front wall includes a medial opening 20 which extends downwardly to the bottom. Doors 22, pivotally attached to the front wall, are movable between open positions uncovering the opening, and closed positions for enclosing the firebox.

A baffle 24 integrally attached to the back wall and side walls extends diagonally upwardly from the back wall dividing the firebox into an upper heating section 25 and a lower burning section 27. In the embodiment illustrated the baffle extends along the side walls nearly to the front wall. However, it has a medial cutout 26 located in its front margin which serves as a passageway between the two sections of the firebox.

Figure 6:
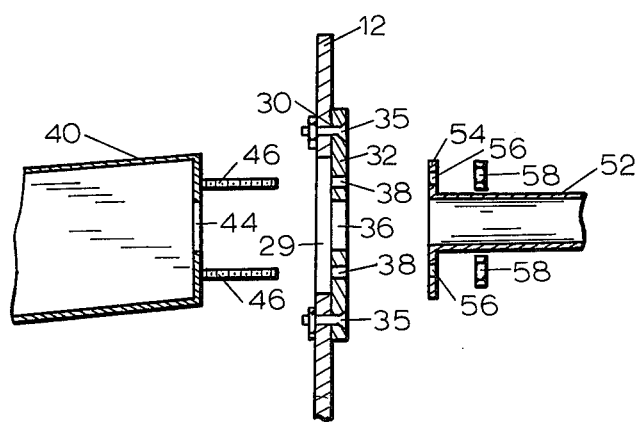
FIG. 6 is an exploded view, in section, showing the installation of the heater.

Stoves of this class are provided with optional flue openings, one located in the top and one located in the back wall. However, due to the internal flow characteristics the chimney 28 normally is attached to the top flue opening and the rear flue opening 29, FIG. 6, is covered with a removable plate (not shown). Thus bores 30 are located in the back wall in a spaced array about the rear flue opening for mounting the plate.

The forced air heating system of the present invention enters the stove through the rear flue opening and is attached to the stove by means of the bores 30 located in the back wall. Two embodiments of the invention are shown. The first, best illustrated in FIGS. 3 and 4, exits heated air through the opening 20 in the front wall. The second embodiment, best illustrated in FIGS. 8 and 9, exits the heated air through the flue opening 29 in the back wall.

Figure 3:
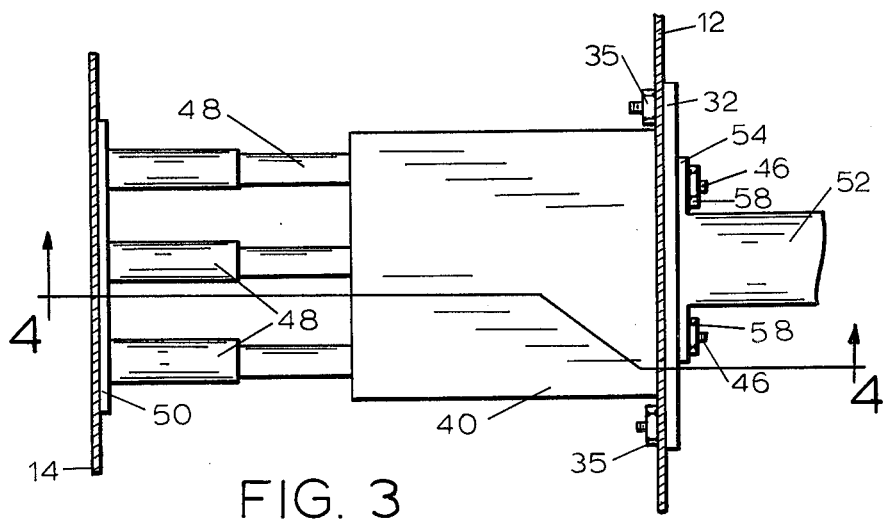
FIG. 3 is a fragmentary, horizontal, sectional view of the heater taken on the line 3—3 of FIG. 1.
Figure 4:
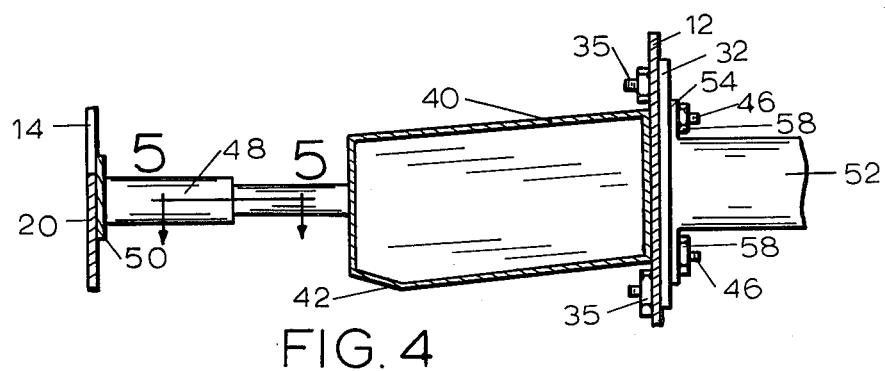
FIG. 4 is a fragmentary, vertical, sectional view taken on the line 4—4 of FIG. 3.
Figure 7:
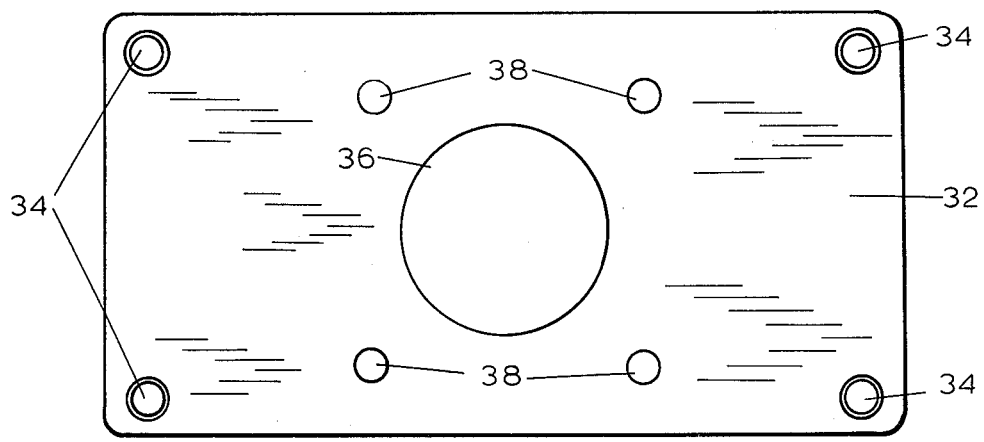
FIG. 7 is a detailed view of the mounting plate of FIG. 6 which mounts the heater in the stove.

Referring first to the embodiment shown in FIGS. 3 and 4, the heater comprises a mounting plate 32, FIG. 7, which is configured for covering the rear flue opening 29. In the embodiment illustrated the mounting plate has holes 34 located at each corner and arranged for alignment with bores 30 in the stove back wall. The holes are countersunk on one side for flush mounting bolts 35 which attach the mounting plate releasably to the stove back wall 12. Located in the mounting plate is a central opening 36 about which a spaced array of bores 38 are located.

A plenum chamber 40, in this instance arranged in the shape of a rectangular box, is configured for placement in the upper section 25 of the firebox. Accordingly, the lower front edge 42 of the plenum chamber is angled allowing insertion of the plenum chamber over baffle 24. Inlet means, such as circular opening 44, FIG. 6, located in the rear wall of the plenum chamber interconnects the plenum chamber with the mounting plate adjacent to opening 36. Studs 46 are mounted on the rear wall of the plenum chamber in a manner to align with bores 38 in the mounting plate.

Figure 5:
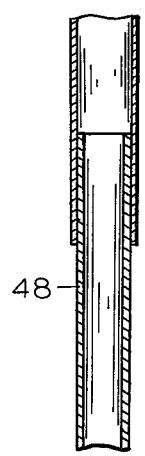
FIG. 5 is a fragmentary sectional view taken on the line 5—5 of FIG. 4.

Outlet means such as tubes 48, located in the front wall of the plenum chamber, open outside of the stove for exiting the air heated in the plenum chamber into the room which is heated. In the embodiment illustrated three such tubes are provided, each comprising paired elements, FIG. 5, one of which is configured for telescoping inside of the other, allowing the tubes to be extended or retracted. The tubes are arranged for extending to a position adjacent to the opening 20 in the front wall of the stove. A deflector plate 50 is attached to the outer extremity of the tubes in a manner for engaging the front wall preventing outwardly extension of the tubes therepast.

Air for the heater is supplied by an electric motor powered fan 52. Mounting means, such as flange 54, interconnects the fan to the mounting plate at opening 36 opposite the plenum chamber 40. To this end openings 56, FIG. 6, are located in the flange in a manner for aligning with studs 46.

Nuts 58 are configured for engaging studs 46 secure the plenum chamber and the fan to the mounting plate.

The second embodiment of the invention is best shown in FIGS. 8 and 9. In this embodiment the mounting plate 60, FIG. 10, which is similar to mounting plate 32, includes a first opening 62 and a second opening 64 evenly spaced medially therethrough. Bores 66 are located in the mounting plate in spaced arrays around each opening 62 and 64. Countersunk holes 68 are located in the corners of the mounting plate in a manner for alignment with the bores 30 in the stove back wall 12.

The plenum chamber 70 in this embodiment comprises an elongated cylindrical element which is located in the upper section 25 above the cutout 26 of the baffle 24. Inlet means such as tube 72 interconnects the mounting plate with the plenum chamber at opening 62. Studs (not shown), attached to the inner extremity of tube 72, are arranged to communicate with the associated set of bores 66 in the mounting plate.

An electrical motor-powered fan 74 is attached to the mounting plate, opposite opening 62, by means such as a flange (not shown) defining bores which communicate with the studs in the tube 72. Nuts (not shown) secure the inlet means and the fan to the mounting plate.

Outlet means, such as tube 76, interconnects the plenum chamber with the second opening 64 of the mounting plate. Studs (not shown) attached to the inner extremity of tube 76 are arranged to communicate with the associated set of bores 66 in the mounting plate. An exhaust tube 78 attached to the mounting plate oppositely opening 64 is reversely bent upwardly over the top of the stove. A flange (not shown) attached to the exhaust tube defines openings which communicate with the studs in tube 76. Nuts (not shown) secure the outlet means and the exhaust tube to the mounting plate.

OPERATION

The first step in installing the heater in the stove is to remove the cover plate (not shown) from the rear flue opening 29. Referring first to the embodiment shown in FIGS. 1, 2, 3, 4 and 6, the mounting plate 32 is attached to the rear wall of the stove by installing bolts 35 through holes 34 and bores 30. The plenum chamber 40 then is inserted into the upper section 25 of the firebox above baffle 24 through opening 20 in the front wall 14. Studs 46 are inserted through bores 38 in the mounting plate, and the opening 56 in flange 54 of the fan are placed over the studs from the back of the stove. Nuts 58 are placed on the studs and tightened securing the heater to the stove.

To use the stove the doors 22 are opened and the tubes 48 are extended forwardly until the deflector plate 50 contacts the front wall 14. A fire is lighted in the lower section of the firebox in the normal manner. Fan 52 then is turned on and air is forced into the plenum chamber 40 where it is heated by the exhaust gases of the stove. The heated air then is forced out tubes 48 into the room.

The embodiment illustrated in FIGS. 8 and 9 is installed and operated in a manner similar to that just described.

It will be noted that in both embodiments the heater is located entirely within the upper section 25 of the firebox. Thus it does not interfere with the building of the fire in the lower section 27. Also it is not located in direct proximity with the fire nor its ash, preventing the corrosive effects thereof from damaging it. Finally, being located entirely within the upper section of the firebox, the heating system does not lessen the aesthetic value of the stove.

It also will be noted that with the second embodiment of the present invention the doors 22 may be closed when the unit is in operation increasing the efficiency of the stove. In addition, since the plenum chamber 70 in this embodiment is located directly above the cutout 26 of the baffle 24, the exhaust gases are split around the plenum chamber increasing its heat transfer efficiency.

Having thus described my invention in a specific embodiment, I claim:

1. A forced air heater for installation into a stove of the type having a firebox enclosed by side walls, a back wall, a top, a bottom, and a front wall, having an opening in the front wall with doors piviotably attached thereto arranged for closing the opening, having flue openings in both the top and in the back wall, containing spaced bores in said back wall arranged around the flue opening located therein for mounting a cover plate, and having a baffle diagionally dividing the firebox into a lower burning section and an upper heating section, the heater comprising:
    (a) a mounting plate configured for covering the flue opening in the back wall of the stove, said mounting plate having a central opening passing there through in alignment with the flue opening;
    (b) the mounting plate having bores located therein in a manner for aligning with the bores in the stove backwall;
    (c) bolts configured for being received in the bores in the mounting plate and in the backwall for fastening the mounting plate to the stove;

(d) a rectangular plenum chamber configured for placement in the upper heating section of the stove firebox;

(f) the plenum having a first wall defining an opening configured to be in alignment with the central opening in the mounting plate;

(g) the mounting plate having holes located in a spaced array around said central opening;

(h) studs mounted on said first wall of the plenum chamber in a manner for communicating with the holes in the mounting plate, and nuts configured for engagement with the studs, securing the plenum chamber to the mounting plate;

(i) a fan and fan mounting means interconnecting the fan to the mounting plate in alignment with the central opening located therein; and (j) outlet means connected to the plenum chamber and opening outside the stove.

2. The heater of claim 1 wherein the fan mounting means comprises an exit flange having openings arranged for alignment with the studs of the plenum chamber.

3. The heater of claim 1 wherein the outlet means includes at least one tube mounted in the wall of the plenum chamber opposite the wall containing the opening, and arranged for extending to a position adjacent to the opening in the front wall of the stove.

4. The heater of claim 3 wherein the tubes each comprises paired elements, one of said elements freely telescoping in the other of said elements allowing the inlet to be moved inwardly for closing the door of the stove.

5. The heater of claim 3 wherein the outlet means further includes a deflector plate attached to the extremity of said tube and arranged for engaging the front wall of the stove preventing extension of the tubes outwardly of the opening in the front wall of the stove.

* * * * *

UNITED STATES PATENT AND TRADEMARK OFFICE
CERTIFICATE OF CORRECTION

PATENT NO. : 4,085,725
DATED : April 25, 1978
INVENTOR(S) : Michael V. Mesenbrink It is certified that error appears in the above–identified patent and that said Letters Patent are hereby corrected as shown below:

Col. 3, Line 35    After "58" delete the word --are--.

Col. 4, Line 15    Change "opening" to --openings--.

Col. 4, Line 19    After "48" delete the word --are--.

Signed and Sealed this

Nineteenth Day of December 1978

[SEAL]

Attest:

RUTH C. MASON
Attesting Officer

DONALD W. BANNER
Commissioner of Patents and Trademarks